(12) United States Patent
Fielding

(10) Patent No.: US 11,161,181 B2
(45) Date of Patent: Nov. 2, 2021

(54) INDUSTRIAL HIGH SPEED MICRO DRILL

(71) Applicant: Advanced Turbine Support, LLC, Gainsville, FL (US)

(72) Inventor: Gary Ryan Fielding, Saratoga Springs, UT (US)

( * ) Notice: Subject to any disclaimer, the term of this patent is extended or adjusted under 35 U.S.C. 154(b) by 173 days.

(21) Appl. No.: 16/156,772

(22) Filed: Oct. 10, 2018

(65) Prior Publication Data

US 2019/0076984 A1 Mar. 14, 2019

Related U.S. Application Data

(62) Division of application No. 15/700,116, filed on Sep. 9, 2017.

(51) Int. Cl.
| | | |
|---|---|---|
| *B23B 51/00* | (2006.01) | |
| *B23B 51/12* | (2006.01) | |
| *B24B 41/00* | (2006.01) | |
| *B24B 41/06* | (2012.01) | |
| *B24B 49/12* | (2006.01) | |
| *B23B 39/14* | (2006.01) | |
| *B25D 17/08* | (2006.01) | |

(52) U.S. Cl.
CPC .......... *B23B 39/14* (2013.01); *B23B 51/0054* (2013.01); *B23B 51/126* (2013.01); *B23B 2251/426* (2013.01); *B23B 2260/068* (2013.01); *B25D 17/084* (2013.01)

(58) Field of Classification Search
CPC ...... B25D 17/00; B25D 17/08; B25D 17/084; B25F 3/00; B25F 5/00; B25F 5/006; A61B 1/00; A61B 1/081; A61B 17/32002; A61B 10/04

USPC ......................................................... 173/215
See application file for complete search history.

(56) References Cited

U.S. PATENT DOCUMENTS

| | | | | |
|---|---|---|---|---|
| 1,251,133 | A * | 12/1917 | Thiemer .............. | A61B 1/0058 408/124 |
| 5,349,940 | A * | 9/1994 | Takahashi ........ | A61B 17/32002 356/241.4 |
| 6,264,660 | B1 * | 7/2001 | Schmidt .................. | A61N 7/00 606/100 |
| 2002/0022765 | A1* | 2/2002 | Belson ................. | A61B 1/0058 600/146 |
| 2006/0189845 | A1* | 8/2006 | Maahs ................. | A61B 1/0051 600/146 |
| 2012/0315598 | A1* | 12/2012 | Kim ...................... | A61C 1/188 433/132 |
| 2016/0213446 | A1* | 7/2016 | Khandelwal ............. | A61C 1/05 |

* cited by examiner

*Primary Examiner* — Nathaniel C Chukwurah
*Assistant Examiner* — Jacob A Smith
(74) *Attorney, Agent, or Firm* — Kearney, McWilliams & Davis, PLLC; William Yarbrough

(57) ABSTRACT

The present invention discloses an industrial high speed micro drill that is made to access remote and inaccessible locations in order to blend, grind, polish and cut materials and parts as determined by visual inspection powered via a pneumatic power source. The high speed drill is deployed by a controlled, articulating guide tube that acts in a multidirectional fashion to direct the action of the assemblage and allow for discrete manipulation of the pneumatically powered drill while harboring a channel and pneumatic power source carrying rubber tubing.

13 Claims, 3 Drawing Sheets

INDUSTRIAL HIGH SPEED MICRO DRILL

CROSS-REFERENCE TO RELATED APPLICATIONS

U.S. Provisional Application No. 62/385,537 filed on Sep. 9, 2016 U.S. Nonprovisional application Ser. No. 15/700,116 filed on Sep. 9, 2017

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

Field of the Invention

The present invention relates, generally, to a high-speed micro drill attached to an articulating guide tube for work in constrained areas. Specifically, the present invention consists of an articulating guide tube, rubber tubing, a high-speed drill attachment and various drill bits and related attachments for grinding, blending, drilling, polishing and cutting materials in constricted spaces and areas otherwise inaccessible using conventional drills.

Background of the Invention

Visual inspection, specifically Remote Visual Inspection (RVI), as it relates to Nondestructive Testing (NDT), is a field long dominated by borescopes (of which video scopes and fiberscopes are a part) where distance, cumbersome angles and poor lighting preclude direct visual inspection of critical spaces for aberrations and imperfections that may affect the functionality of various mechanical devices. Moreover, while these areas may be accessible via direct inspection, the process is usually destructive, cost-prohibitive, time-inefficient (or a combination thereof) or in some other way wholly impractical.

Clearly, while these mechanical devices tend to be on a larger scale in terms of both size and value, the functional aspects of dismantling machines and mechanisms for direct inspection on the size and order of aircraft engines, large steam, gas and wind turbines, electric generators and process piping (oil and gas and otherwise) is not only difficult and costly but otherwise untenable.

Yet, inspection of the inner working components of such large machinery constitutes merely the diagnostic function of baseline inspections, outage planning, pre-commissioning, post-overhaul, unit troubleshooting and warranty inspections. Once discovered, minor and intermediate structural issues reach the same fate as major issues in that, once discovered, these defects must be made accessible through dismantling of the occluding portions of the machine in order to reach and repair the found imperfection(s). Just as visual inspection has the aforementioned physical and financial costs, so too does the restoration of integral parts through disassemblage and repair.

The ability to correct found defects and aberrations that can readily lead to structural weaknesses and systems failures is a practical aspect of inspection (and the present invention) that has heretofore eluded inspection professionals. Although detection through various devices (i.e. rigid, flexible, and video-assisted borescopes) has long been a mainstay in the inspection field, correction of detected flaws and imperfections has not. The present invention, therefore seeks to remedy this deficiency.

Thus, there is a long-felt but significant and un-met need in the art for an industrial high speed micro drill and method for use that aids inspection professionals in repairing damaged and flawed sections and areas of large machinery including engines, turbines, generators and piping, both investigational or remedial purposes, that is novel, practical and useful. The present invention satisfies this long-standing need in the art.

DESCRIPTION OF THE PREFERRED EMBODIMENTS

The present invention provides a device (and method for use) that is intended to be an easy to use, as well as easily accessible and manipulated, device that facilitates the correction of detected flaws and materials weaknesses prior to a subsequent system failure or a cascading, multiple systems failures that could prove dangerous and costly, both temporally and financially. Advantages of the present invention include, but are not limited to, preservation of the integrity of the mechanical device being inspected, decreased time for minor and intermediate repairs, reduced cost for minor and intermediate repairs, and the ability to accomplish both in situ visual inspection and repair simultaneously.

In a preferred embodiment, the present invention provides a device comprising a means to grind, blend, drill, polish and cut materials in areas that are constrained or otherwise spatially inaccessible. As Shown in FIG. 1, the industrial high speed micro drill that is the present invention 11 constitutes a means to accomplish required remedial repairing tasks which encompasses the parts including, but not limited to, (1) a high speed drill head assembly 15, which is reversibly coupled to a combination (2) articulating guide tube 19 and wholly encompassed (3) rubber tubing 21 that is made to run within the articulating guide tube 19 and is structured and designed to provide pneumatic pressure to the high speed drill head assembly 15 and (4) various drill bit attachments (not shown) that serve to allow for the present invention's functionality. Moreover, FIG. 1 further depicts one representation of an articulation control unit 25 that is required for the manipulation and proper control and functioning of the present invention. Here, the articulation control unit 25 is represented with 2 control knobs (27 and 29) which work singly and in combination to allow the drill bit to be operated in both X and Y planes (i.e. up, down and side to side) and to be discreetly placed in the desired area and position. And while the articulation control unit 25 is a manually derived depiction, it is well observed, and within the spirit and the scope of the invention, to have an electronic controlling mechanism without detracting from the utility of the present invention.

FIG. 2 illustrates a drill head attachment 31 that is positioned in a nominally straight forward position where the bit head 33 is bound to the drill head attachment 31 distally and by the bit shank 37 proximally. The drill head attachment 31 being made to accept and receive pneumatic power, which is then converted to mechanical energy, through the communication with the rubber tubing 21 running within the articulating guide tube 19. However, the drill head attachment 31 may be position rotatable (not shown) to accommodate various and varying angles to achieve other positional degrees as depths and angles dictate to move in both X, Y and Z planes.

FIG. 3 illustrates a drill head attachment 35 positioned in at a 90-degree angle position, with relation to drill head attachment 31, where the bit head 33 is reversibly bound to the drill head attachment 31 distally and by the bit shank 37 proximally. The drill head attachment 31 being made to accept and receive pneumatic power (through air or water or other gas or fluid material), which is then converted to mechanical energy via a pneumatic turbine (not shown) located within the drill head assembly via a communication with the rubber tubing 21 running within the articulating guide tube 19. However, the drill head attachment 35 may be position rotatable (not shown) to accommodate various and varying angles to achieve other positional degrees as depths and angles dictate to move in both X, Y and Z planes.

FIG. 4 displays an expanded view of the inventions bit head 33 which is made to reversibly and quickly receive various attachments for the several required tasks, including but not limited to, grinding, blending, drilling, polishing and cutting materials and bit shank 37 that is made to receive pneumatic power (through air, water or other gas or fluid material) via rubber tubing 21 running within the articulating guide tube 19.

FIG. 5 is a cross sectional view of the rubber tubing 21 running within the articulating guide tube 19.

In another preferred embodiment, the present invention 11 works independently of a rigid or flexible borescope (not shown) where the borescope is utilized to view different angles of the operations of the present invention (e.g. angles of a cut) and as a "scout" and guide to determine preferred avenues of insertion of the present invention.

In another preferred embodiment, the present invention 11 works in tandem with a borescope where the borescope is a flexible borescope and runs alongside and exterior to the articulating guide tube 19.

In another embodiment, the present invention 11 works in tandem with a borescope where the bore scope is a flexible borescope and runs parallel to the internalized rubber tubing 21 and within the articulating guide tube 19.

In another embodiment, the present invention 11 utilizes a combination of independent and dependent (exteriorly or internally parallel running) borescopes, a combination of independent borescopes, or a combination of dependent borescopes.

In another embodiment, the drill head attachments 31 and 35 and drill shank 37 may be free rotatable via a ball and socket or other means to achieve various desired or required angles for drill or attachment use up to and including a 360 degree turn radius.

In another embodiment, the drill bit shank 37 may be extendable via a telescoping configuration where tubes of ever decreasing diameter are encompassed within one another in a projecting and retracting manner to allow for movement compensating for varying depths.

In another embodiment, the depth and multi-directional control may be controlled and guided by another external or integrated computerized articulation control unit.

In yet another embodiment, the preferred embodiment of the present invention 11 is an articulating guide tube 19 (with a 10 mm outer diameter and a 6 mm inner diameter) which is approximately 12 feet in length (plus or minus 1 inch) that is capable of 4-way articulation and has attached to it a drill bit shank 37, distally, where the drill bit shank 37 (approximately 0.0625 inches in diameter and harbors rubber tubing 21 to provide pneumatic pressure which is converted to mechanical energy (received by the high speed drill head 15). The drill bit shank 37 communicates with a high speed drill head (having the dimensions of approximately 0.5 inches by 0.5 inches) that is designed to receive drill, burr and polishing bits as is required by the particular flaw discovered and is preferably 0.450 inches in length 50, 0.0625 ($\frac{1}{16}$") in diameter and is connected to an increasing taper 34 length of 0.03125" ($\frac{1}{32}$") to attachment with the bit head 33 where the taper from the shank side 51 begins at 0.0625 "($\frac{1}{16}$") and ends at 0.09375 ($\frac{3}{32}$") from the bit side 53. In total, the high speed drill head assembly 15 is made to receive pneumatic power via rubber tubing 21 that traverses the hand piece 41 and the length of the articulating guide tube 19 to distally attaching to the high speed drill head 15 and provide the power source via a gas or fluid medium—preferably air. The micro head assembly, drill bits and drill attachments rotate in a range of approximately 50,000 to 300,000 RPM and perform cutting, drilling, polishing, grinding and blending tasks. These tasks and their accomplishment are facilitated by a multidirectional articulation control unit 25 that is capable of reaching otherwise inaccessible locations through a manually guided direction, a wide array of ranges of motion and controlled angles.

The foregoing descriptions of the embodiments of the present invention have been presented for purposes of illustration and description. They are not intended to be exhaustive or to limit the present invention to the precise forms disclosed. The exemplary embodiments were chosen and described in order to best explain the principles of the present invention and its practical application, to thereby enable others skilled in the art to best utilize the present invention.

Figure 1:
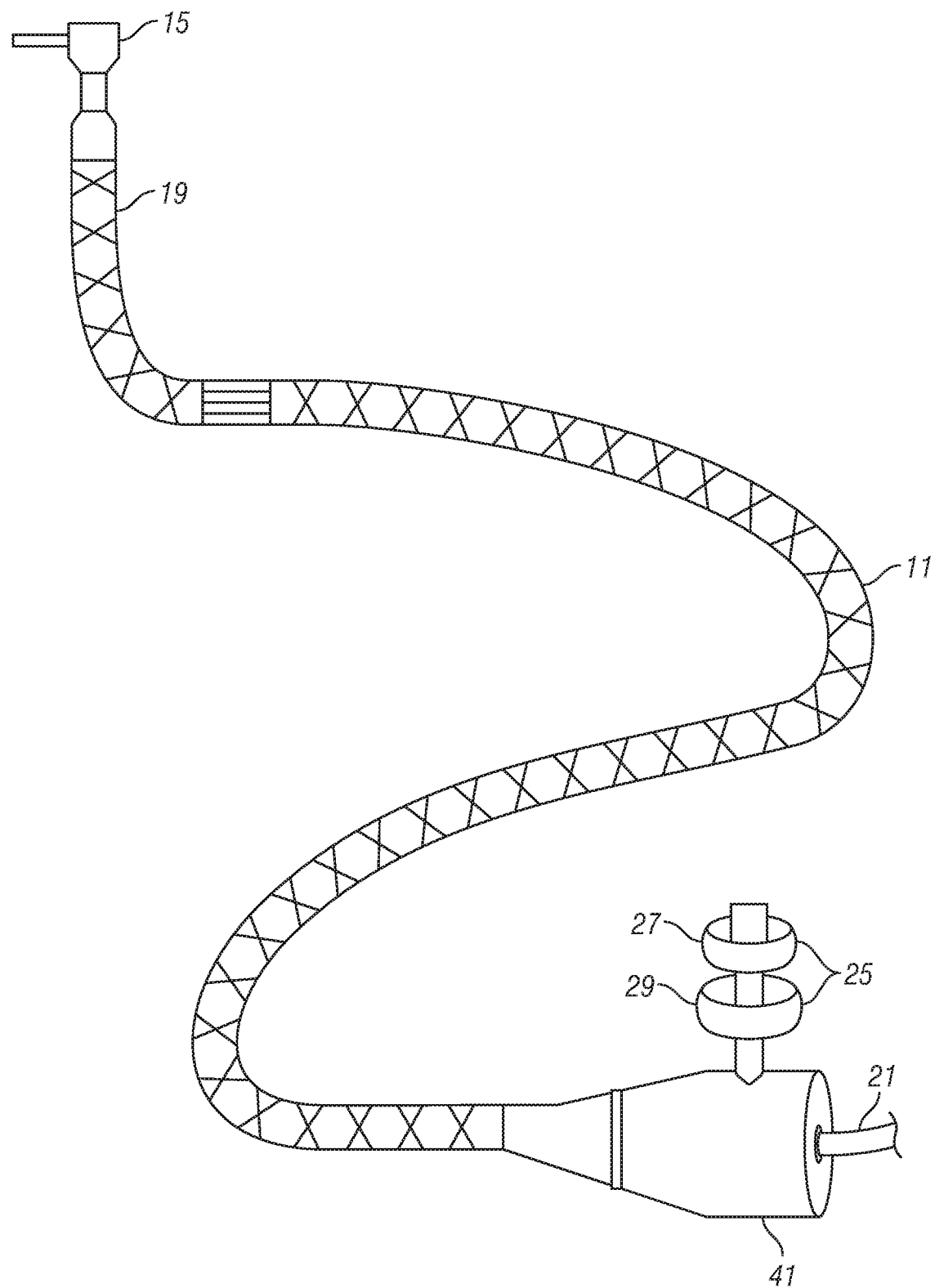
FIG. 1 depicts a side view of the present invention.
Figure 2:
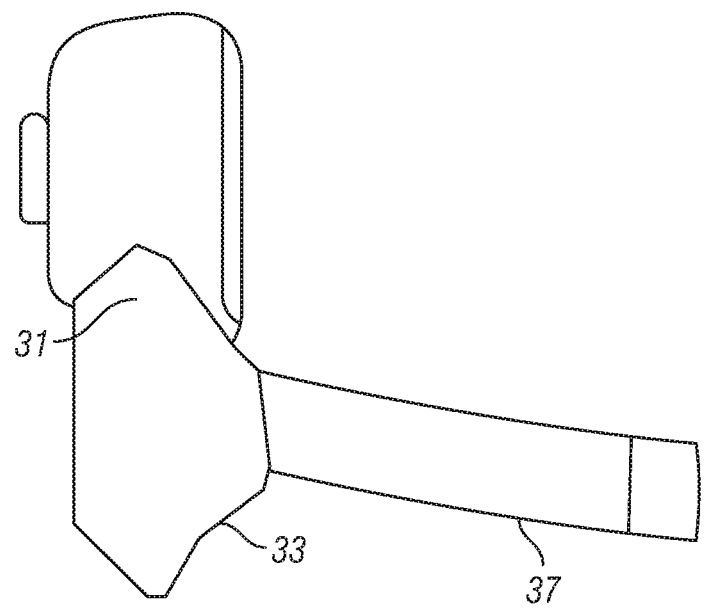
FIG. 2 depicts a side view of the drill head of the present invention in a straight forward configuration.
Figure 3:
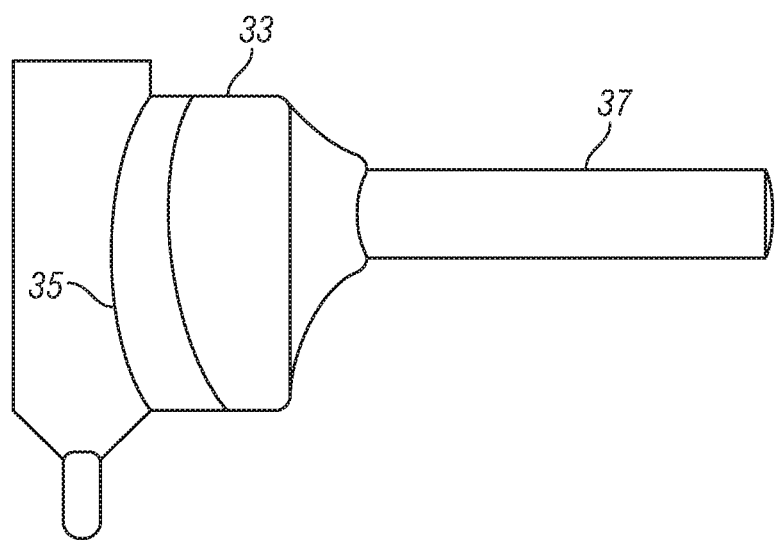
FIG. 3 depicts a side view of the drill head of the present invention at a 90-degree angle.
Figure 4:
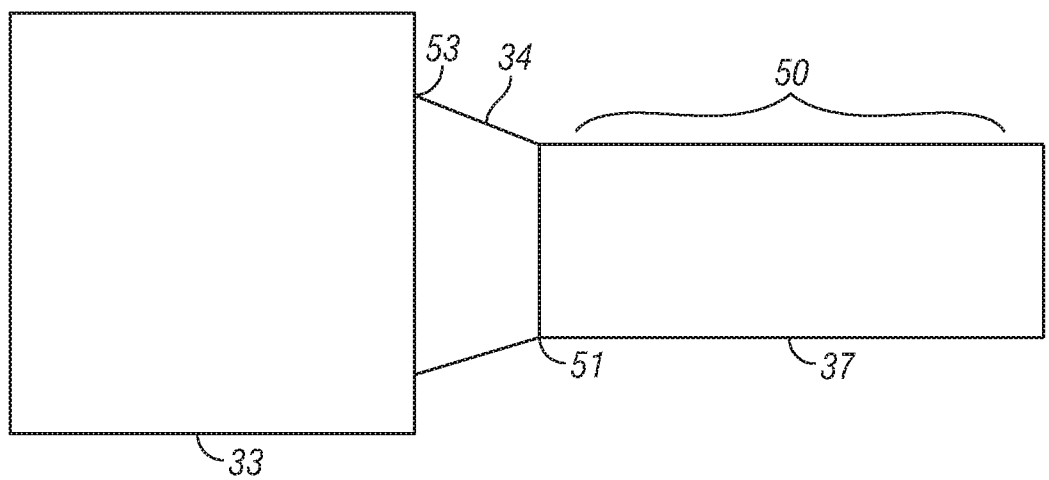
FIG. 4 presents a side view of a bit head and bit shake made to accommodate various attachments.
Figure 5:
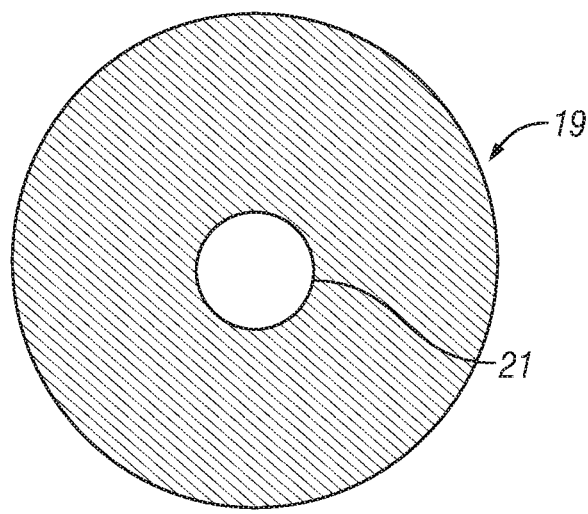
FIG. 5 displays a cross-sectional view of the rubber tubing encircled by the guided articulating tube.

I claim:

1. An industrial high speed micro drill assemblage method for grinding, blending, drilling, polishing and cutting materials wherein said use comprises the steps of:
attaching an industrial high speed micro drill head assembly to the most distal region of an industrial high speed micro drill assemblage;
said assemblage comprising the high speed micro drill head assembly, an articulating guide tube, an articulating guide tube hand piece and internalized tubing;
said articulating guide tube having a proximal and a distal end;
attaching to the distal end of said articulating guide tube a high speed micro drill head;
attaching to the proximal end of said articulating guide tube a hand piece;
running through said hand piece, and said attached articulating guide tubing, internalized tubing capable of supplying said high speed drill head assembly with pneumatic power, via pneumatic pressure, which is converted to mechanical energy;
integrating into said hand piece an articulating control unit; and manipulating said articulating control unit to operate the drill head assembly in X, Y, and Z planes.

2. The industrial high speed micro drill assemblage method of use of claim 1, wherein said industrial high speed micro drill head assembly is capable of accepting various drill bit attachments, reversibly, for grinding, blending, drilling, polishing and cutting materials.

3. The industrial high speed micro drill assemblage method of use of claim 1, wherein said internalized tubing is rubber.

4. The industrial high speed micro drill assemblage method of use of claim 1, wherein manipulating said articulating control unit may be via an electronic controlling mechanism to operate the drill head assembly in the X, Y and Z planes.

5. The industrial high speed micro drill assemblage method of use of claim 1, wherein a drill head attachment is positioned at a nominally 90 degree angle position.

6. The industrial high speed micro drill assemblage method of use of claim 1 wherein the drill bit attachments and drill bit shank may be freely rotatable via a ball and socket or other means to achieve various desired or required angles for drill or attachment use up to and including a 360 degree turn radius.

7. The industrial high speed micro drill assemblage method of use of claim 1, wherein said pneumatic power is air, gas or other fluid material.

8. The industrial high speed micro drill assemblage method of use of claim 1, wherein said industrial high speed micro drill assemblage works independent of, but in tandem with, a rigid or flexible borescope functioning as a scout or guide.

9. The industrial high speed micro drill assemblage method of use of claim 1, wherein said assembly is manually guided, through analog or computerized control unit, in a wide array of ranges of motion and controlled angles in X, Y and Z planes.

10. An industrial high speed micro drib assemblage method of use, where said assembly is an articulating guide tube abutted on either end by a drill bit assembly and an articulation control unit, capable of 4-way articulation for grinding, blending, drilling, polishing and cutting of materials in confined spaces of a turbine wherein the drill bit assembly is supplied with a pneumatic energizing pressure, via an internalized tube, which is converted to mechanical energy for functional operation and guided in X, Y and Z planes by said articulation control unit.

11. The industrial high speed micro drill assemblage method of use of claim 10 wherein said drill bit assemblage comprises a drill bit shank designed to reversibly accept a drill bit head, burr and polishing bits for the remediation of discovered flaws within a turbine.

12. The industrial high speed micro drill assemblage of claim 11 wherein the drill bits and drill attachments rotate in a range of 50,000 to 300,000 RPM and perform cutting, drilling, polishing, grinding and blending tasks.

13. The industrial high speed micro drill assemblage of claim 12 wherein said internalized tubing works independent of an externalized borescope or in tandem with an externalized or internalized borescope for scouting and guiding.

* * * * *

UNITED STATES PATENT AND TRADEMARK OFFICE
CERTIFICATE OF CORRECTION

PATENT NO. : 11,161,181 B2
APPLICATION NO. : 16/156772
DATED : November 2, 2021
INVENTOR(S) : Gary Ryan Fielding Page 1 of 1

It is certified that error appears in the above-identified patent and that said Letters Patent is hereby corrected as shown below:

In the Claims

Column 6, Line 6 - Please replace "An industrial high speed micro drib assemblage" with "An industrial high speed micro drill assemblage"

Signed and Sealed this
Twenty-seventh Day of August, 2024

Katherine Kelly Vidal
*Director of the United States Patent and Trademark Office*